(12) United States Patent
Zank (10) Patent No.: US 8,994,686 B2
(45) Date of Patent: *Mar. 31, 2015

(54) DIGITIZER

(75) Inventor: Anthony E. Zank, Westlake Village, CA (US)

(73) Assignee: Topaz Systems, Inc., Simi Valley, CA (US)

( * ) Notice: Subject to any disclaimer, the term of this patent is extended or adjusted under 35 U.S.C. 154(b) by 37 days.

This patent is subject to a terminal disclaimer.

(21) Appl. No.: 13/492,741

(22) Filed: Jun. 8, 2012

(65) Prior Publication Data
US 2013/0093717 A1    Apr. 18, 2013

Related U.S. Application Data

(63) Continuation-in-part of application No. 13/441,732, filed on Apr. 6, 2012.

(60) Provisional application No. 61/548,118, filed on Oct. 17, 2011.

(51) Int. Cl.
| | | |
|---|---|---|
| *G06F 3/045* | (2006.01) | |
| *G06F 3/0488* | (2013.01) | |
| *G06F 3/039* | (2013.01) | |
| *G06F 3/0354* | (2013.01) | |

(52) U.S. Cl.
CPC .............. *G06F 3/0488* (2013.01); *G06F 3/039* (2013.01); *G06F 3/03547* (2013.01); *G06F 2203/04808* (2013.01)
USPC ....................................... 345/174; 178/18.03

(58) Field of Classification Search
CPC ... G06F 1/1616; G06F 1/169; G06F 3/03547; G06F 3/041–3/047; G06F 2203/04101–2203/04113; G06F 3/0488; G06F 3/039; G06F 2203/04808
USPC .......... 345/173–178; 178/18.01–18.09, 18.11
See application file for complete search history.

(56) References Cited

U.S. PATENT DOCUMENTS

| | | | |
|---|---|---|---|
| 4,686,332 | A | 8/1987 | Greanias et al. |
| 4,931,782 | A | 6/1990 | Jackson |
| 5,252,951 | A | 10/1993 | Tannenbaum et al. |
| 5,386,219 | A | 1/1995 | Greanias et al. |
| 5,414,227 | A | 5/1995 | Schubert et al. |
| 6,473,073 | B1 | 10/2002 | Fleck |

(Continued)

OTHER PUBLICATIONS

PCT/US2012/066992, International Filing Date Nov. 29, 2012; Notification of Transmittal of International Search Report and Written Opinion dated Mar. 4, 2013.

*Primary Examiner* — Stephen Sherman
(74) *Attorney, Agent, or Firm* — Jeffrey G. Sheldon; Leech Tishman Fuscaldo & Lampl (57) ABSTRACT

A system for receiving, storing, and displaying biometric input has a case, a touchpad, and a digitizer. The case has an open position and a closed position, wherein the case protects the touchpad in the closed position, the case including a digitizer comprising a substantially transparent touch activatable overlay placed over the touchscreen, and a plurality of sensors supported by the overlay to detect input to the overlay. The digitizer includes a data outlet for transferring the detected input as overlay data so the touchpad can visually display the detected input on its touchscreen. The digitizer has sufficient sensors that the overlay data contains more information than the touchpad data would if the touchscreen were contacted directly without the digitizer present.

11 Claims, 4 Drawing Sheets

(56) References Cited

U.S. PATENT DOCUMENTS

| | | |
|---|---|---|
| 7,324,095 B2 | 1/2008 | Sharma |
| 7,894,634 B2 | 2/2011 | Chung |
| 7,973,957 B2 | 7/2011 | Dodge et al. |
| 2002/0030816 A1* | 3/2002 | Nakano et al. ............... 356/399 |
| 2002/0149571 A1* | 10/2002 | Roberts ........................ 345/174 |
| 2003/0025680 A1* | 2/2003 | Tsang .......................... 345/178 |
| 2006/0139338 A1 | 6/2006 | Robrecht et al. |
| 2007/0216662 A1* | 9/2007 | Tanaka et al. ................ 345/173 |
| 2011/0187655 A1 | 8/2011 | Min et al. |

\* cited by examiner

DIGITIZER

CROSS-REFERENCE TO RELATED APPLICATION

This application is a continuation-in-part of U.S. patent application Ser. No. 13/441,732 titled "Digitizer," filed Apr. 6, 2012, which claims priority from U.S. Provisional Patent Application No. 61/548,118 filed Oct. 17, 2011, the contents of which are incorporated in this disclosure by reference in their entirety.

BACKGROUND

Touchscreen computers, also called touchpads, like the iPad® by Apple Inc., are becoming common. A key technology that has driven their acceptance is the touchscreen. This input mechanism has many useful features, such as the ability to pinch fingers to zoom, scroll, and allow multi-finger typing. However, touchpads do not respond well to stylus or finger input, as touchscreens require a fairly broad conductive contact with the touchscreen to detect position or motion.

In addition, most touchscreens utilize heavy filtering algorithms and relatively low sampling rates, making them very limited in their usefulness for forensically authenticable signature capture, which has become and continues to be an important element of and feature for doing business on portable computing devices.

For the foregoing reasons, there is a need for a better sensing mechanism for use in capturing forensically authenticable signatures in touchpads.

SUMMARY

The present invention is directed to a device that satisfies this need for a better sensing mechanism for use in capturing forensically authenticable signatures in touchpads, and in particular, a digitizer device is provided in the form of a substantially transparent touch activatable overlay for placement over the touchscreen of a touchpad. The touchscreen is adapted for receiving input by contact with the touchscreen, detecting and storing the input as touchpad data in touchpad memory, and visually displaying the input. The touch activatable overlay supports a plurality of sensors to detect the input to the overlay, and at least one data outlet transfers the detected input as overlay data so the touchpad can visually display the detected input on its touchscreen. There are sufficient sensors that the overlay data contains more information than the touchpad data would if the touchscreen were contacted directly without the digitizer device present. Preferably, the digitizer device is configured for a higher sampling rate than the touchpad sampling rate.

Preferably, the digitizer device comprises at least one detectable element supported by the overlay, which can be sensed by the touchscreen in order to determine the presence and position of the device. The detectable element can comprise a spacer that can be hemi-spherical in shape and electrically conductive.

Optionally, the data outlet is selected from one or more of the group consisting of an outlet port and a wireless outlet. The digitizer device can comprise a plurality of data outlets.

Optionally, the data outlet transfers the detected input as overlay data for storage in the touchpad memory. Also, the digitizer can have its own memory for storage of the overlay data.

Also, the digitizer device can comprise overlay memory for storing the detected data.

Typically, the digitizer itself does not visually display the input.

Optionally, the digitizer device comprises digitizer electronics for determining the position of a stylus on or over the device.

In one version of the invention, the digitizer device is used with a touchpad having a capacitive touchscreen, the capacitive touchscreen adapted for receiving input by contact with the capacitive touchscreen, detecting and storing the input as touchpad data in touchpad memory, and visually displaying the input. The overlay supports a plurality of communicative elements for transferring the detected input as overlay data directly to the capacitive touchscreen so the touchpad can visually display the detected input on its touchscreen. Preferably, the overlay has an inner surface for placement proximate to the capacitive touchscreen, and the communicative elements are supported by the inner surface. The communicative elements can transfer the detected input to the capacitive touchscreen by directly contacting the capacitive touchscreen. The communicative elements can be a plurality of electrically conductive dots. Optionally, the conductive dots can be programmed to change varying capacitive effects.

The device can include a bracket for holding the touch activatable overlay co-planar and secure to the touchscreen. The bracket can be configured to slide, hinge, or swivel into place. A preferred advantage of using such a digitizer is that the digitizer is secured in place on the surface of the touchscreen for ease of use.

In one version of the invention, a case having an open position and a closed position, wherein the case protects the touchpad in the closed position, is included with the digitizer. The digitizer can be embedded in the case so that it can be easily secured co-planar to the touchscreen. A preferred advantage of using such a digitizer is that it offers convenience for the user by allowing easy access to the digitizer, and also provides protection for the digitizer and touchpad.

Preferably, the input comprises biometric data such as signature, pressure, stylus tilt, time and date stamp, speed of input, and signing duration. Optionally, the biometric data can comprise fingerprint, handprint, eye scan, face recognition, and other similar types of data.

DRAWINGS

These and other features, aspects, and advantages of the present invention will become better understood with regard to the following description, appended claims, and accompanying drawings where:

DESCRIPTION

In the Summary above, in this Description, the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Figure 1:
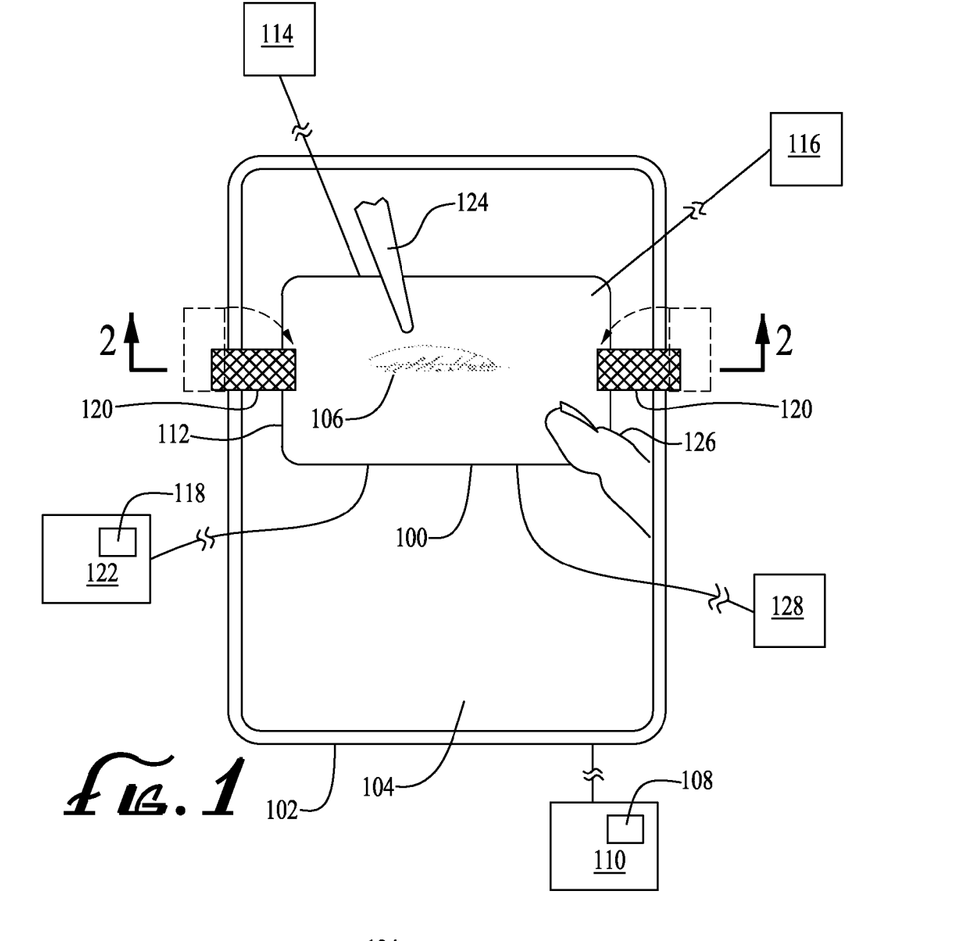
FIG. 1 is a top plan view of a digitizer device according to the present invention in combination with a touchpad.
Figure 2:
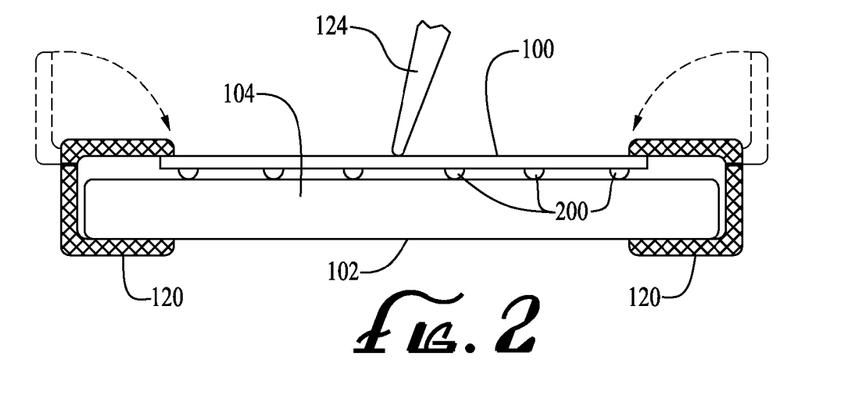
FIG. 2 is a sectional view of the digitizer device in combination with the touchpad of FIG. 1 taken along line 2-2 in FIG. 1.

With regards to FIGS. 1 and 2, a digitizer device 100 for use with a touchpad 102 has features of this invention. The touchpad 102 has a touchscreen 104 adapted for receiving input by contact with the touchscreen 104, detecting the input, storing the input as touchpad data 108 in touchpad memory 110, and visually displaying the input on the touchscreen 104 as visual display 106. The digitizer device 100 comprises a substantially transparent touch activatable overlay 112 for placement over the touchscreen 104, a plurality of sensors 114 supported by the overlay 112 to detect the input, and a data outlet 116 for transferring the detected input as overlay data 118 so the touchpad 102 can visually display the detected input on its touchscreen 104 as the visual display 106. There are sufficient sensors 114 that the overlay data 118 contains more information than the touchpad data 108 would if the touchscreen 104 were contacted directly without the digitizer device 100 present. For this purpose, typically the digitizer device 100 is configured for a higher sampling rate than the touchpad 102. "Sampling rate" in this context is defined as the number of samples per unit of time (usually seconds) taken from a continuous signal to make a discrete signal.

The touchscreen 104 can be of any type known or developed in the future, including, but not limited to, capacitive, resistive, surface acoustic wave, infrared, optical imaging, dispersive signal, and acoustic pulse recognition. A capacitive touchscreen comprises an insulator such as glass, coated with a transparent conductor such as indium tin oxide (ITO). An example of a device that has a capacitive touchscreen is the iPad® by Apple Inc. The touchscreen 104 can be completely flat, and can also include a frame that protrudes outwardly from the touchscreen 104.

The input can comprise biometric data, including, but not limited to, user signature, input pressure, input tilt, speed of input, the amount of time it takes to sign the signature, and time and date stamp. The biometric data can also comprise eye scan, fingerprint, handprint, face recognition, and other similar types of data. It is advantageous to sense and record biometric data in order to make the signature forensically authenticable. Forgeries usually do not have the same pressure and tilt of an authentic signature, and also take much longer to sign.

The biometric data can be generated and authenticated by means well-known in the art, including, but not limited to, means as disclosed in U.S. Pat. Nos. 5,414,227 and 7,894,634, which are incorporated herein by reference.

The touchpad memory 110 can be any well-known means of storing memory in the art, including, but not limited to, flash memory.

The overlay 112 can comprise glass, plastic, or both glass and plastic. Preferably the overlay 112 is sufficiently thin so that it does not protrude too far above the touchscreen 104 when placed on the touchscreen 104. The overlay 112 can be any shape or size, and can be larger or smaller than the touchscreen 104. The structure of overlays is well-known in the art, such as disclosed in U.S. Pat. Nos. 4,686,332, 4,931,782, 5,386,219, and 7,324,095, which are incorporated herein by reference.

The sensors 114 can be any well-known sensors in the art, including, but not limited to, 4-wire, transparent traces, infrared, and those disclosed by U.S. Pat. Nos. 4,686,332, 5,386,219, and 7,324,095, which are incorporated herein by reference.

Each data outlet 116 can be adapted to be used with various connections, including, but not limited to, serial, universal serial bus, other outlet ports, Ethernet, Bluetooth, WiFi, infrared connections, and other wireless outlets. The data outlets 116 can be adapted to transmit the overlay data 118 to the touchpad memory 110 for storage therein.

In one version of the invention, the digitizer device 100 comprises a bracket 120 for holding the overlay 112 co-planar and secure to the touchscreen 104. The bracket 120 can be configured in a variety of ways, including, but not limited to, sliding, hinging, or swiveling into place. FIGS. 1 and 2 illustrate some of the ways the bracket 120 can move.

The digitizer device 100 can comprise overlay memory 122 for storing the overlay data 118. The overlay memory 122 can be any well-known means of storing memory in the art, including, but not limited to, flash memory, thumb drive, and external hard drives.

The input can be entered by a stylus 124 or its equivalent such as a finger 126, wherein the digitizer device 100 comprises digitizer electronics 128 for determining the position of the stylus 124 or finger 126 on or over the digitizer device 100. The stylus 124 can be any combination of, including, but not limited to, wired, wireless, active, or passive. The position of the stylus 124 can be determined by the digitizer electronics 128 by means well-known in the art, including, but not limited to, by sensing the distortion caused by the stylus 124 over the overlay 112. U.S. Pat. Nos. 4,686,332, 5,252,951, and 5,386,219 disclose means well-known in the art for sensing a stylus, which are incorporated herein by reference.

A preferred advantage of using such a digitizer device 100 is that the digitizer device 100 does not require its own display screen, thus reducing its cost for manufacture and sale.

As shown in FIG. 2, the digitizer device 100 can have one or more detectable elements 200 supported by the overlay 112 for detection by the touchscreen 104 so the touchscreen 104 can determine the presence and position of the digitizer device 100. Optionally, the detectable elements 200 can protrude from the side of the overlay 112 in contact with the touchscreen 104 and can act as a spacer between the overlay 112 and the touchscreen 104. Additionally, the detectable elements 200 can have friction and non-scratch characteristics and can be electrically conductive. Preferably, the detectable elements 200 comprise a spacer and can be hemi-spherical in shape. The detectable elements 200 may be made of any type of material well-known in the art to have conductive properties, including, but not limited to, elastomeric material, glass, and plastic, which can optionally be loaded with a conductive material such as carbon black.

Because the touchscreen 104 is capable of detecting the detectable elements 200 as multiple touches, the pattern of spacing, size, and location of the detectable elements 200 can be used by the touchpad 102 to determine: 1) that the digitizer device 100 is present and ready to capture and send input to the touchpad 102, 2) which port to use, and/or 3) the position of the digitizer device 100 with respect to the touchscreen 104 so as to indicate to the touchscreen 104 where exactly to draw the input so that it appears to be under the tip of the stylus 124 or finger 126. An application can be installed on the touchpad 102 to facilitate this process.

Figure 3:
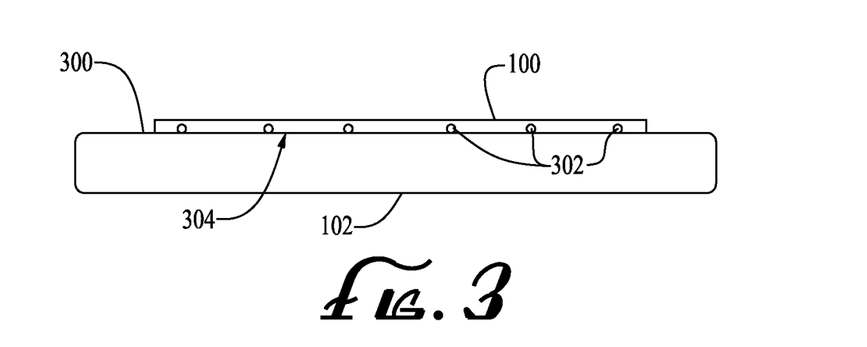
FIG. 3 is a sectional view of a version of the digitizer device according to the present invention.

FIG. 3 shows one version of the invention where the digitizer device 100 is adapted for use with a touchpad 102 having a capacitive touchscreen 300. The overlay 112 supports a plurality of communicative elements 302 for transferring the detected input as overlay data 118 directly to the capacitive touchscreen 300 so the touchpad 102 can visually display the detected input on its touchscreen 300. The overlay 112 has an inner surface 304 for placement proximate to the capacitive touchscreen 300, and the communicative elements 302 are supported by the inner surface 304. The communicative elements 302 can transfer the detected input to the capacitive touchscreen 300 by directly contacting the capacitive touchscreen 300. The overlay data 118 contains more information than the touchpad data 108 would if the capacitive touchscreen 300 were contacted directly without the digitizer device 100 present.

Optionally, the communicative elements 302 are electrically capacitive and can transfer the detected input to the capacitive touchscreen 300 without physically contacting the capacitive touchscreen 300.

Similar to the above, the capacitive touchscreen 300 is capable of detecting the communicative elements 302 as multiple touches. Therefore, the pattern of spacing, size, and location of the communicative elements 302 can be used by the capacitive touchscreen 300 to determine the presence of the digitizer device 100, which port to use, and the exact position of the digitizer device 100 with respect to the capacitive touchscreen 300. However, in addition, the communicative elements 302 can utilize the functionality of the capacitive touchscreen 300 to communicate information, either in digital or analog form, to the capacitive touchscreen 300 by simulating varying programmable capacitive effects. The capacitive effects can be accomplished by receiving and/or applying electrical signals to the communicative elements 302.

Optionally, the communicative elements 302 can comprise a plurality of conductive dots. The conductive dots may be made of any type of material well-known in the art to have conductive properties, including, but not limited to, elastomeric material, glass, and plastic. Optionally, the conductive dots can double as both a conductive element and as a spacer element with friction and non-scratch characteristics. Alternatively, the conductive dots can be flat. Preferably, the conductive dots are in close proximity to each other and are located throughout the entire inner surface 304 of the overlay 112. Optionally, the dots can be equally-spaced and equally-sized.

An advantage of using such a digitizer device 100 is that the one or more communicative elements 302 can be used to increase the data sampling rate and also to uniquely identify the position and characteristics of the digitizer device 100. Another advantage is the input is sensed directly by the capacitive touchscreen 300, thus taking advantage of the capacitive touchscreen's 300 functionality while simplifying the electronics of the digitizer device 100 and reducing the cost of manufacture.

Figure 4:
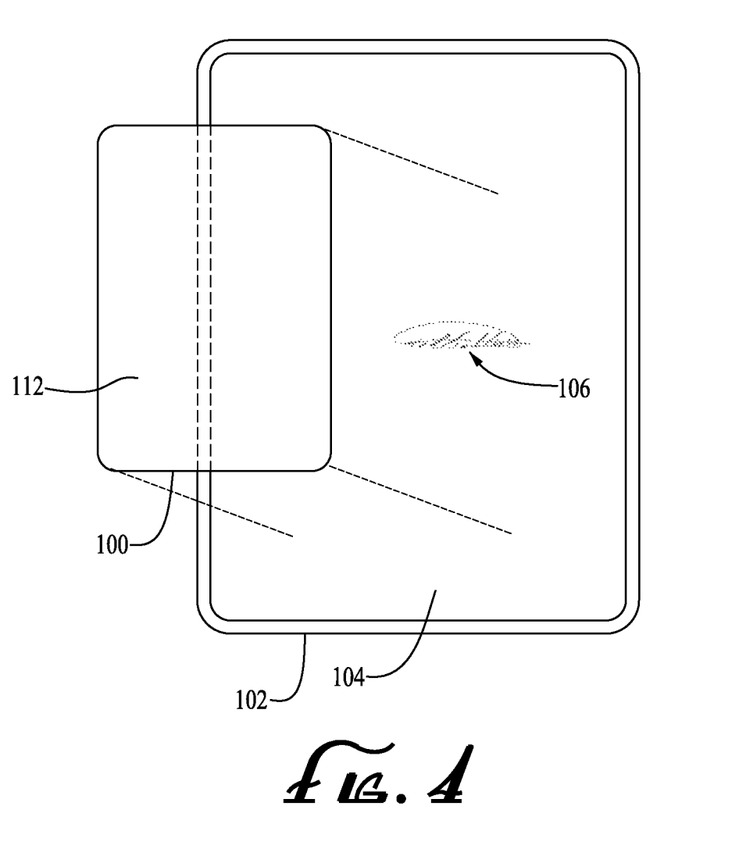
FIG. 4 is an expanded view of the digitizer device in combination with a touchpad.

FIG. 4 shows an expanded view of the digitizer device 100 in combination with a touchpad 102. FIG. 4 is helpful in illustrating how the input, which is not visible, is visually displayed as a visual display 106 of the input on the touchscreen 104 so that a user can see the input on the touchscreen 104.

Figure 5:
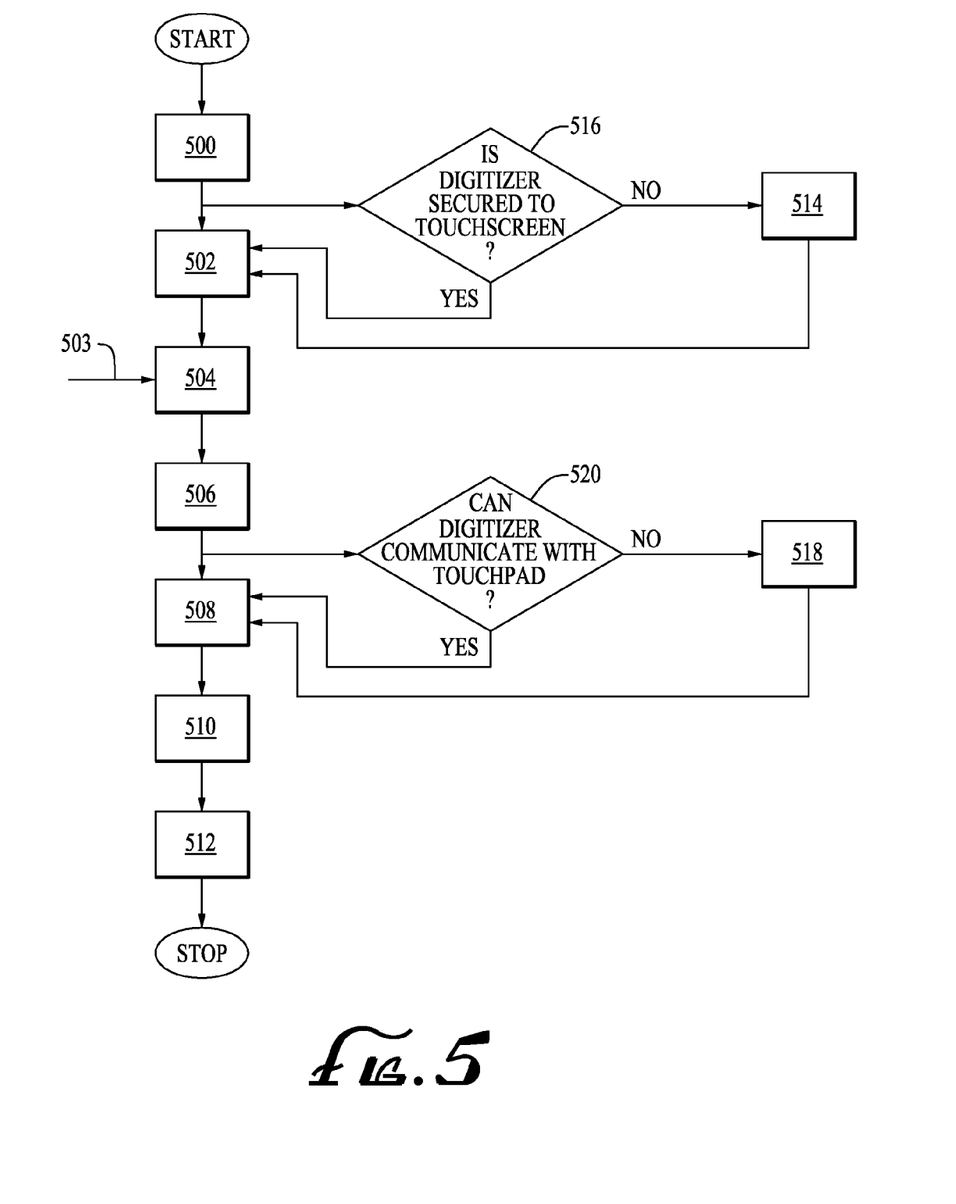
FIG. 5 is a flowchart illustrating a method for inputting information into a touchpad using the digitizer device of FIG. 1.

FIG. 5 shows a flowchart for using one version of the digitizer device 100 in combination with a touchpad 102 for receiving, storing, and displaying input information. The process is commenced by placing the digitizer device 100 over the touchscreen 104 of a touchpad 102, block 500. The digitizer device 100 is connected to the touchpad 102 through the one or more data outlets 116, block 502. The digitizer device 100 receives input 503, block 504. The input 503 is converted by the digitizer device 100 to overlay data 118, block 506. The overlay data 118 is transferred from the overlay 112 to the touchpad 102 for display as a visual display 106 on the touchscreen 104, block 508. The overlay data 118 is saved in the touchpad memory 110 as touchpad data 108, block 510. The touchscreen 104 displays the input as a visual display 106, block 512.

In one version, the steps can further comprise securing the digitizer device 100 co-planar to the touchscreen 104 with a bracket 120, block 514. This step is needed if the digitizer device 100 is not secure to the touchscreen 104, block 516.

In one version, the steps can further comprise running a program on the touchpad 102 to facilitate communication between the digitizer device 100 and the touchpad 102, block 518. This step is needed if the digitizer device 100 is unable to communicate with the touchpad 102, block 520.

In one version, the input comprises biometric input, which is received, stored, and displayed in the same manner described above.

In one version, the digitizer device 100 is used in combination with a capacitive touchscreen 300 to receive, store, and display biometric input.

Figures 6, 7:
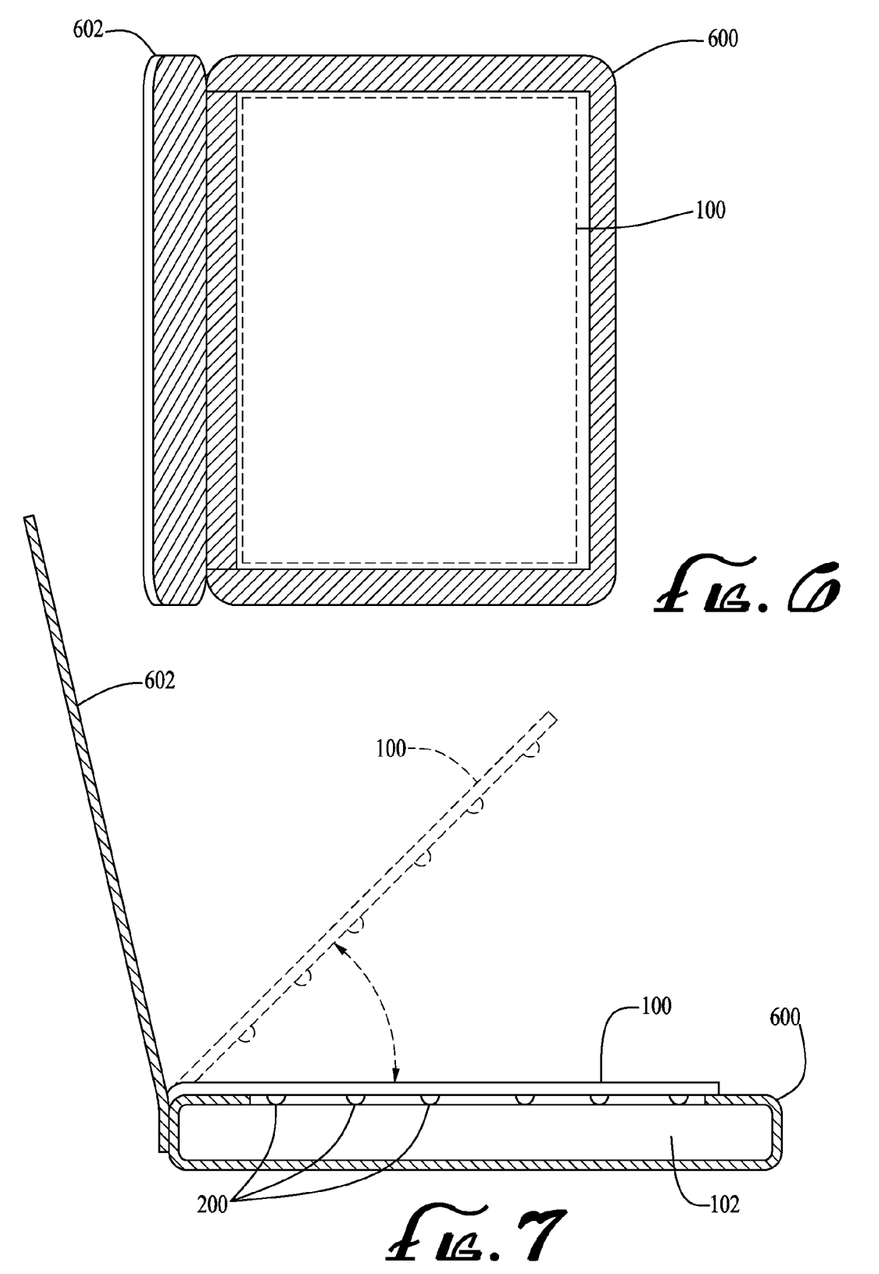
FIG. 6 is a top plan view of the digitizer device in combination with a case and a touchpad.
FIG. 7 is a bottom perspective view of the digitizer device in combination with a case and a touchpad.

In another version of the invention, a case 600 having an open position and a closed position, wherein the case 600 protects the touchpad 102 in the closed position, is included with the digitizer device 100. The digitizer device 100 is embedded in the case 600 such that the digitizer device 100 can be easily secured co-planar to the touchscreen 104 when the case 600 is in the open position. FIGS. 6 and 7 illustrate a version of the case 600, where the digitizer device 100 can have detectable elements 200 (as shown in FIG. 7) or communicative elements 302. The case 600 can also have a flap 602 that folds over the touchscreen 104 to completely envelop the touchpad 102.

FIG. 7 illustrates one of the many ways the digitizer device 100 can be attached to the case 600, and how the digitizer device 100 moves into place on the touchpad 102. The digitizer device 100 can be secured to the case 600 using means well-known in the art.

In another version of the invention, the digitizer 100 is embedded in the case 600, and can be folded into place on the touchscreen 104.

A preferred advantage of having the case 600 is that it offers convenience for the user. Many users who own touchpads 102 also buy protective cases or covers for their touchpads 102. By having the digitizer device 100 included with the case 600, it makes using the digitizer device 100 much more convenient. Additionally, the cover 600 provides protection for the digitizer device 100 and the touchpad 102.

The case 600 can be any case that is well-known in the art, including, but not limited to, the cases and covers sold for use with the various commercially-available touchpads on the market.

Any element in a claim that does not explicitly state "means for" performing a specified function, or "step for" performing a specific function, is not to be interpreted as a "means" or "step" clause as specified in 35 U.S.C. §112, ¶6. In particular, the use of "step of" in the claims herein is not intended to invoke the provisions of 35 U.S.C. §112, ¶6.

Although the present invention has been described in considerable detail with reference to certain preferred versions thereof, other versions are possible. For example, the capacitive elements may comprise electrical contacts, or the device may comprise a frame, or a fingernail may be used to input information. Therefore, the spirit and scope of the appended claims should not be limited to the description of the preferred versions contained herein.

What is claimed is:

1. A system for receiving, storing, and displaying biometric input comprising:
   a. a touchpad having a touchscreen adapted for receiving input by contact with the touchscreen, detecting the input, storing the input as touchpad data in memory, and visually displaying the input on the touchscreen; and
   b. a digitizer comprising:
      i. a substantially transparent touch activatable overlay that overlays the touchscreen when the case is in the open position;
      ii. a plurality of sensors supported by the overlay to detect input to the overlay; and
      iii. a data outlet for transferring the detected input as overlay data so the touchpad can visually display the detected input on its touchscreen,
   wherein the digitizer has a higher sampling rate than the touchpad sampling rate.

2. The system of claim 1, wherein the digitizer is spaced apart from the touchscreen.

3. The system of claim 1, wherein the data outlet is selected from one or more of the group consisting of an outlet port and a wireless outlet.

4. The system of claim 1, comprising a plurality of data outlets.

5. The system of claim 1, wherein the digitizer comprises overlay memory for storing the detected data.

6. The system of claim 1, wherein the digitizer is incapable of visually displaying the input.

7. The system of claim 1, wherein the digitizer comprises a bracket holding the overlay co-planar and secure to the touchscreen.

8. The system of claim 1, wherein the digitizer further comprises a case having an open position and a closed position, the case protecting the touchpad in the closed position.

9. The system of claim 1 or 8, wherein the data outlet transfers the detected input as overlay data for storage in the touchpad memory.

10. The system of claim 8, wherein the digitizer is embedded in the case and folds into place co-planar and secure to the touchscreen.

11. The system of claim 8 wherein the case comprises a flap that folds over the touchscreen to completely envelop the touchpad.

* * * * *

UNITED STATES PATENT AND TRADEMARK OFFICE
CERTIFICATE OF CORRECTION

PATENT NO. : 8,994,686 B2  Page 1 of 1
APPLICATION NO. : 13/492741
DATED : March 31, 2015
INVENTOR(S) : Anthony E. Zank It is certified that error appears in the above-identified patent and that said Letters Patent is hereby corrected as shown below:

IN THE CLAIMS

Column 7, lines 14-15: Remove "when the case is in the open position"

Signed and Sealed this
Sixth Day of October, 2015

Michelle K. Lee
*Director of the United States Patent and Trademark Office*